United States Patent
Worner et al.

(10) Patent No.: US 7,299,911 B2
(45) Date of Patent: Nov. 27, 2007

(54) ABUTMENT MODULE

(76) Inventors: Helmut Worner, Johann-Sebastian-Bach-Strasse 3, Denkendorf (DE) D-73770; Sebastian Unterhuber, Rilkeweg 4, Kongen (AT) D-73257

( * ) Notice: Subject to any disclaimer, the term of this patent is extended or adjusted under 35 U.S.C. 154(b) by 0 days.

(21) Appl. No.: 11/488,798

(22) Filed: Jul. 19, 2006

(65) Prior Publication Data
US 2007/0021011 A1 Jan. 25, 2007

(30) Foreign Application Priority Data
Jul. 19, 2005 (EP) .................. 05015617

(51) Int. Cl.
B65G 47/24 (2006.01)
(52) U.S. Cl. .................. 198/345.3; 193/35 A
(58) Field of Classification Search ............ 198/343.1, 198/345.1, 345.3, 956; 193/35 A
See application file for complete search history.

(56) References Cited

U.S. PATENT DOCUMENTS

| | | | | |
|---|---|---|---|---|
| 5,168,976 A | * | 12/1992 | Kettelson | 198/345.3 |
| 5,211,276 A | * | 5/1993 | Clopton | 198/345.3 |
| 5,676,235 A | * | 10/1997 | Sam et al. | 198/345.3 |
| 5,860,505 A | * | 1/1999 | Metzger | 198/345.3 |
| 6,112,877 A | * | 9/2000 | Herrick, IV | 198/345.3 |
| 6,290,051 B1 | * | 9/2001 | Herrick, IV | 198/345.3 |
| 7,111,721 B1 | * | 9/2006 | Turner | 198/345.3 |
| 2003/0116408 A1 | | 6/2003 | Topmiller et al. | |
| 2006/0104752 A1 | | 5/2006 | Ludwig et al. | |

FOREIGN PATENT DOCUMENTS

| | | |
|---|---|---|
| DE | 299 04 234 U1 | 6/1999 |
| DE | 10 2005 001 387 A1 | 7/2006 |
| EP | 0 484 648 A | 5/1992 |
| EP | 0 713 980 A | 5/1996 |
| EP | 1 264 110 B1 | 12/2002 |
| EP | 1 621 491 A1 | 2/2006 |
| WO | WO 01/69093 A1 | 9/2001 |

* cited by examiner

Primary Examiner—James R. Bidwell
(74) Attorney, Agent, or Firm—Browdy and Neimark, PLLC

(57) ABSTRACT

An abutment module, more especially for automatic processing and conveying equipment, comprises an abutment member arranged on a base for objects moving in a current working direction of movement in a plane of motion, such abutment member being able, by means of a fluid power operated servo member, to be shifted out of and back into such plane of motion, at least one position sensor being provided by which at least the abutment position of such object striking the abutment member may be detected, and a bus station for a bus system to detect and process position sensor signals of the at least one position sensor is integrated in the abutment module, and at least one control valve is integrated in the abutment module, such control valve being able to be controlled electrically by way of the bus system and serving for control of the servo member.

10 Claims, 2 Drawing Sheets

ABUTMENT MODULE

BACKGROUND OF THE INVENTION

The invention relates to an abutment module, more especially for automatic processing and conveying equipment, comprising an abutment member arranged on a base for objects moving in a current working direction of movement in a plane of motion, such abutment member being able, by means of a fluid power operated servo member, to be shifted out of and back into such plane of motion, at least one position sensor being provided by which at least the abutment position of such object striking the abutment member may be detected.

THE PRIOR ART

An abutment module of this type is described in the European patent publication 0 484 648. The abutment disclosed here is able to be shifted by means of a pneumatically operated servo piston out of and back into the path of movement of arriving workpieces. For compressed air actuation a compressed air connection is provided on the housing by way of which compressed air may be supplied in a controlled manner. Moreover a damping means is provided for the abutment so that the movement of the impacting workpieces may be damped. In this case a position sensor is provided to detect the terminal impact position of the abutment.

SHORT SUMMARY OF THE INVENTION

One object of the invention is to create an abutment module of the type initially mentioned which as compared with conventional abutment modules or, respectively, abutments is able to be employed in a more universal fashion and in a more particularly compact and accordingly more economic manner.

In order to achieve these and/or other objects appearing from the present specification, claims and drawings, in the present invention in an abutment module, more especially for automatic processing and conveying equipment, comprising an abutment member arranged on a base for objects moving in a current working direction of movement in a plane of motion, such abutment member being able, by means of a fluid power operated servo member, to be shifted out of and back into such plane of motion, at least one position sensor being provided by which at least the abutment position of such object striking the abutment member may be detected, a bus station for a bus system to detect and process signals of the at least one position sensor is integrated in the abutment module, and at least one control valve is integrated in the abutment module, such control valve being able to be controlled electrically by way of the bus system and serving for control of the servo member.

Thus there is an improved functionality as compared with conventional abutment modules since with the integrated bus station processing of the position sensor signals may take place on board the abutment module. On the other hand in the case of conventional abutment module it is necessary to firstly conduct the position sensor signals to an external control means for the purpose of processing them and then return the signal response. A further advantage is that the control valve is also already integrated in the abutment module so that an awkward and more particularly relatively bulky fluid connection is no longer necessary between the abutment module and an external control valve. Using the abutment module in accordance with the invention means also that functions may be performed which are otherwise only possible in the case of conventional abutment module when connected with external components. Accordingly the abutment module in accordance with the invention may be employed for example for processing and conveying equipment, which only offer a small amount of space for additional components.

The servo member is able to be actuated by means of a fluid pressure medium. In the case of the fluid medium it will preferably be a question of compressed air. However other gaseous or hydraulic pressure mediums may be used.

In the case of a further development of the invention the abutment module possesses at least one fluid connection for the connection of a non-regulated fluid duct. It is possible accordingly to connect the abutment module directly with an compressed air producer or, respectively, a compressed air receiver without flowing through an external control valve. In the case of conventional abutments on the other hand a diversion by way of an external control valve must be employed so that the abutment module is supplied with already controlled or regulated compressed air.

In a particularly preferred fashion the abutment module may have at least one bus connection for the connection of a bus line. Accordingly it is possible for the bus station located in the abutment module to be additionally connected with an external control means so that there is the possibility of either processing the position sensor signals in the bus station located on board or to pass on the position sensor signals by way of the bus station to the external control means where signal processing is performed. Furthermore a combination of signal processing on board and external signal processing is possible. Alternatively there may be a wireless transmission of the sensor signals to the internal bus station and/or to the external control means.

In a particularly preferred fashion the at least one fluid connection and the at least one bus connection are arranged on the same outer side of the abutment module. Accordingly the convenience of connection is increased, since the connection of all medium lines is possible from one side. It is naturally also possible for the at least one fluid connection and the at least one bus connection to be arranged on different outer sides of the abutment module.

It is possible for at least one of the position sensors to be provided for detection of the top functional position, located in the path of movement objects, of the abutment member. Accordingly it is possible to detect whether the abutment member is in its top functional position or retracted in its bottom retracted position.

In accordance with a preferred embodiment at least one of the position sensors is provided for detection of the position of a passing object. Accordingly it is possible to detect whether a respective object is just moving over the abutment module and/or whether the object has already moved over the abutment module.

In the case of a further development of the invention the abutment module possesses a damping means by which the abutment member may be shifted between a first abutment position and a second terminal abutment in a damped fashion, the abutment position, which may be detected by means of the at least one position sensor, being the terminal abutment position of the abutment member. It is therefore possible to detect whether the abutment member is located in its terminal abutment position or not.

However in principle an undamped abutment member could be utilized, the abutment position, which is able to be detected by the at least one position sensor, being the contact position on contact between the abutting object and the abutment member.

In a particularly preferred manner at least three position sensors may be provided, of which at least one may detect the terminal abutment position of the abutment member, at least one may detect the position of a passing object and at least one may detect the top functional position of the abutment member.

In a particularly preferred manner the bus system is a field bus system and more especially an AS-i bus system. It is naturally possible for other field bus systems to be employed, for example VME bus, CAN and Versabus bus systems.

In accordance with a further development of the invention the abutment module possesses a control module unit which is separately designed from the base but is more particularly detachably connected to it, and in the unit the bus station, the control valve and at least one of the position sensors are received. The components required for control are accordingly neatly accommodated in such control module unit. Since the control module unit is able to be detachably mounted of the base, it is possible for same to be interchanged against another control module unit, for example one fitted with a different bus station.

The control valve located in the abutment module may be designed in the form of a solenoid valve. As an alternative it is possible to utilize a spool valve.

Further advantageous developments and convenient forms of the invention will be understood from the following detailed descriptive disclosure of one preferred embodiment thereof in conjunction with the accompanying drawings.

LIST OF THE SEVERAL VIEWS OF THE FIGURES

DETAILED ACCOUNT OF WORKING EMBODIMENT OF THE INVENTION

Figure 1:
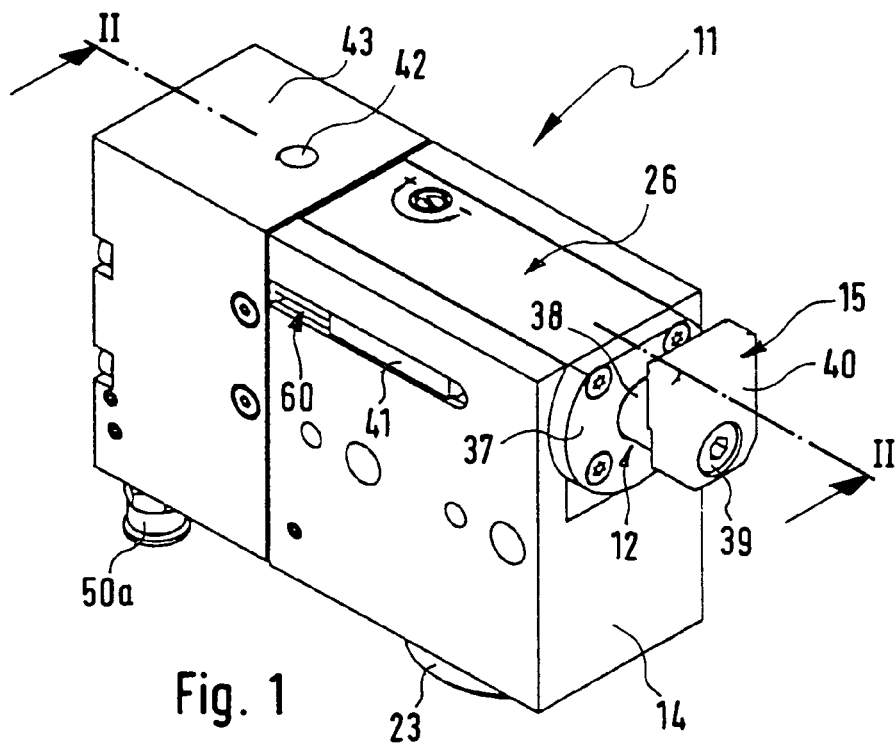
FIG. 1 shows a preferred embodiment of the invention's abutment module in perspective.

FIGS. 1 through 4 show a preferred embodiment of the abutment module 11 in accordance with the invention, which in the following will be explained with reference to such a module with a damping means 12. It is however also possible, as has been already mentioned, to employ an abutment module 11 without a damping means.

The abutment module 11 is preferably employed for automatic processing or conveying equipment in order to singularize workpieces or the like for example moving in a path of motion in one working direction 13 of movement. After sigularization the objects 17 may then be individually treated, for example processed, diverted etc.

The abutment module possesses a base 14, on which an abutment member 15 is arranged that by means of a fluid power operated servo member 16 is able to be moved out of, and back into, the plane of motion of the objects 17. Moreover, there is also the above mentioned damping means 12, by which the abutment member 15 is able to be moved from a first abutment position as far as a second terminal abutment position.

The principal design and the manner of functioning of such an abutment module 11 with the damping means 12 are described in the said European patent publication 0 484 648, which is explicitly incorporated herein by reference.

Figure 2:
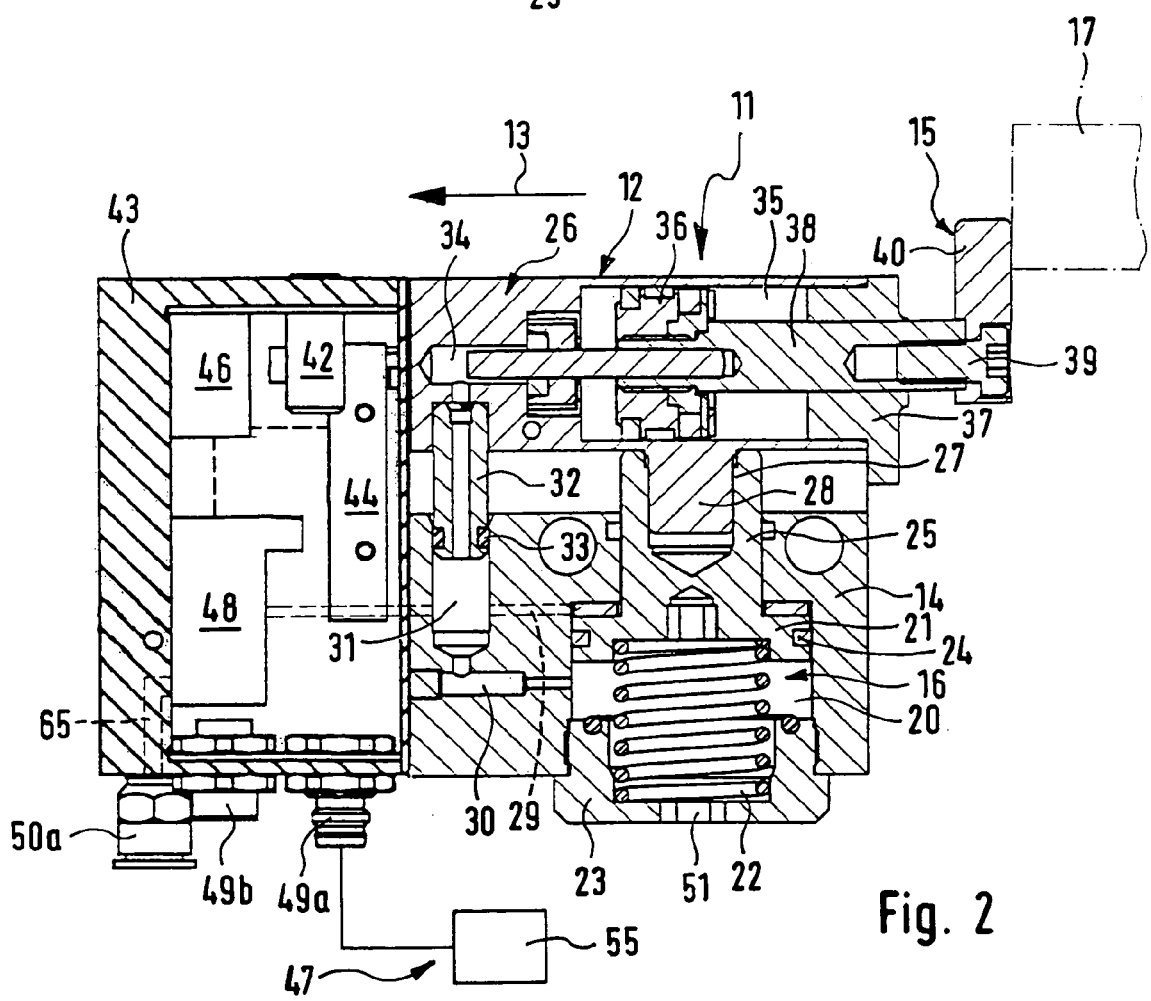
FIG. 2 shows the abutment module of FIG. 1 in a longitudinal section taken on the line II-II in figure.
Figure 3:
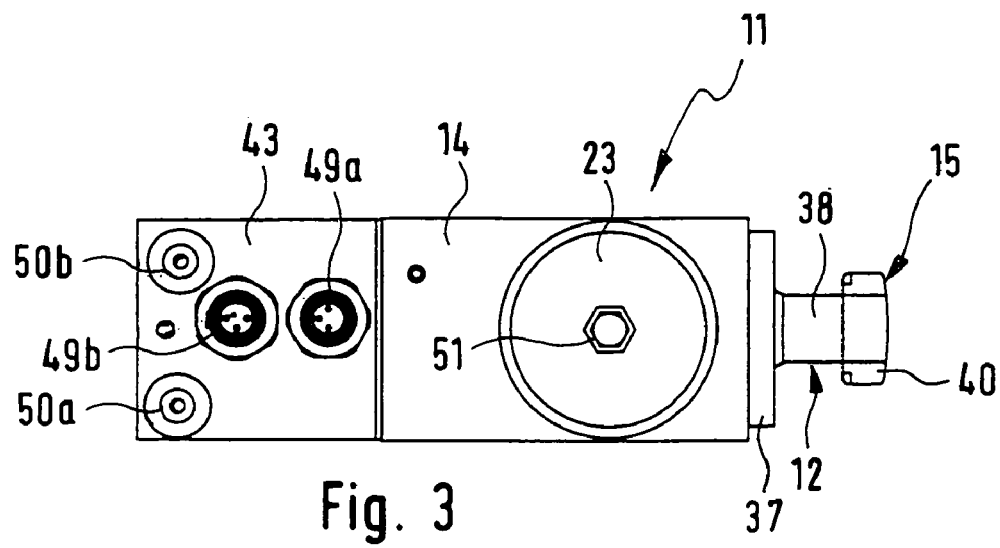
FIG. 3 shows the abutment module of FIG. 1 from below.
Figure 4:
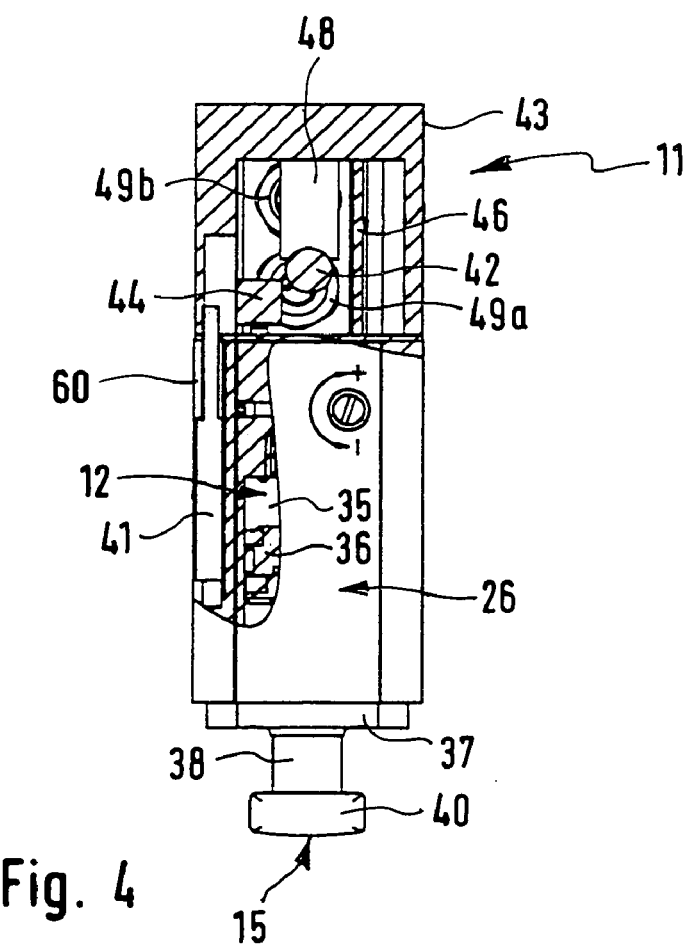
FIG. 4 is a partly sectioned view of the abutment module of FIG. 1 as seen from above.

As more especially illustrated in FIG. 2 a pneumatic servo member 16 is provided having a servo piston 21 sliding in a cylinder space 20 in the base 14. This servo piston 21 is held in its top terminal position by a setting spring, more particularly a helical spring 22, which is arranged between its bottom end side and a bottom end plate 23. The servo piston 21 is guided by means of a piston seal 24 and is in sealing engagement with the wall of the cylinder space 20. The servo or control piston 21 integrally merges with a generously dimensioned piston rod 25 at its top end side. As an alternative it would also be possible to connect the servo piston 21 by anchoring means, more especially in the form of a screw joint, with the piston rod 25. The piston rod 25 extends right through the top portion of the base 14 and has its top free end fixed in a damping cylinder 26 of the damping means 12. Such attachment is for example such that the piston rod 25 has a recess 27 (similar to a blind hole), in which a pin-like spur 28, formed on the damping cylinder 26 is received. In order to stop between the relative motion between the damping cylinder 26 and the piston rod 25 there may be a press fit between the recess 27, similar to a blind hole, and the pin-like spur 28.

A first pressure line 29, for a pneumatic control pressure P, extends through a lateral wall of the base 14 and opens at the top edge or, respectively, the top end face of the servo piston 21.

Approximately half way up the cylinder space 20 a second pressure line 30 extends between the cylinder space 20 and the outer side of the base 14. From the second pressure line 30 there extends a third pressure line 30 with a cylinder-like configuration, vertically upward as far as the outer side of the base. From the damping means 26 there extends a fourth pressure line 32, designed like a piston, in a downward direction and enters the third pressure line 31 with a sealing engagement. To ensure such sealing guiding action there is a seal 33 surrounding the fourth pressure line. The fourth, piston-like, pressure line 32 is connected with the damping cylinder 26 with a motion-stabilizing or ganging effect, for example by a screw joint, welding, bonding, brazing, an interference fit and the like. The fourth piston-like pressure line 32 is connected by way of a further fifth pressure line with a cylinder space 35 in the damping cylinder 26, in which a damping piston slides and by means of a piston seal sealing engagement with the wall of the cylinder space 35 is provided.

On the damping piston 36 the L-like abutment member 15 is mounted, which extends through a cylinder plate 37 terminating the cylinder space. The abutment member 15 is here by way of example represented in the form of a two-part abutment member 15 having on the one hand a base body 38 extending coaxially to the damping cylinder 26 and connected with the damping piston 36 and on the other hand a upwardly cranked limb 40 and connected with the base body using attachment means, more particularly in the form of a screw joint. It is naturally possible as well to employ an integrally designed abutment member.

Furthermore a first position sensor 41 is provided using which the abutment or impact position of the object against abutment member 15 may be found. In the case of the abutment module described herein with a damping means the first position sensor is utilized to find or detect the terminal abutment position 19 of the abutment member 15. The first position sensor 41 is seated in a slot-like recess 60 in the damping cylinder 26 and is responsive to complete retraction of the damping piston 36. As an alternative it would be possible to arrange the first position sensor 41 on the cylinder end plate so that it, when designed for example in the form of a proximity sensor, would respond to the approach of the limb 40 of the abutment member 15.

Furthermore a second position sensor 42 is provided for the detection of the position of the passing object. The second position sensor 42 may for this purpose be mounted on the top of a control module unit 43, to be described infra. Finally a third position sensor 44 is provided serving for detecting the top functional position, in the path of motion of the objects, of the abutment member 15.

In the abutment module 11 a bus station 46 for a bus system 47 is integrated for the detection and processing of signals of the at least one position sensor 41, 42 and 43 and furthermore at least one control valve 48 (electrically controlled by way of the bus system 47) is integrated in the abutment module 11 such valve 48 serving for the control of the servo member 16. As a bus system preferably an AS-i system is utilized.

The control valve 48 and the bus system 46, diagrammatically illustrated in FIG. 2, are mounted in the already mentioned control module unit 43, which for their part are detachably secured to the rest of the abutment module 11, i.e. on the base 14 and on the damping means 12. The unit comprising the damping means 12 and the base 14 could also be termed an actuator unit. On the outer side, more particularly the bottom side, of the control module unit 43 there are for example two bus connections 49a and 49b by way of which the internal bus system 46 arranged on board is connected to externally arranged component of the bus system 27, for example to an external control means 55 by way of bus lines. Preferably one of the bus connections 49a is in the form of an output and the other bus connection 49 is in the form of an input. The individual position sensors 41, 42 and 44 are also connected by way of internal bus line (not illustrated) with the bus station 46. Moreover, on the same outer side, at which the bus connections 49a and 49b are arranged, i.e. the bottom side of the control module unit, fluid connections 50a and 50b are present, one of the fluid connections 50a serving for the connection of an unregulated fluid line (not illustrated). This so-called air supply line 50a is again connected by way of a pressure line 65 with the control valve 48. The power connection of the control valve 48 is for its part united with the first pressure line 29 so that controlled or regulated compressed air may be supplied to the servo piston 21 of the servo member 16. The other fluid connection 50b is in the form of a so-called venting connection and is again connected by way of a corresponding pressure line (not illustrated) with the control valve 48 so that if necessary venting may take place via the control valve 48.

The manner of operation of the abutment module 11 is such that an object 17 arriving from the right, as marked in chained lines and for instance may be a workpiece and more particularly part of a machine or the like, firstly reaches the first abutment position of the abutment member 15 so that the member pushes the damping piston 36 into the cylinder space 35. The displaced compressed air then flows by way of the fourth piston-like pressure line 32 and of the third pressure line 31 into the cylinder space 20 of the servo member 16 and thence into the surroundings via a through hole 51 in the end plate 23. Here for instance a muffler (not illustrated) may also be arranged to suppress noise, more particularly noise due to hard impact of impinging objects. The degree of damping of the damping means is in this case able to be adjusted by suitable selection of the cross sections of the pressure lines 30, 31, 32 and 34. The first position sensor 41 detects when the terminal abutment position is reached by the abutment member 15 and sends a signal to the bus station 46.

If now the object 17 is to continue its movement in the indicated direction 13 a control signal stemming from the bus station 46 or from an external control means 55 is sent to the control valve 48 which is then switched over so that the first pressure line 29 is put under the pressure P. This pressure is responsible for the servo piston 21 being shifted downward against the force of the setting spring 22 and by way of the piston rod 25 shifts the damping cylinder 26 and accordingly the abutment member 15 downward as well. Accordingly the object 17 is then allowed to pass.

When the top edge of the servo piston 21 reaches the position of the second pressure line 30, same its also subjected to the pressure P so that compressed air may flow through the pressure lines 31, 32 and 34 into the cylinder space 35. This means that the damping piston 36 is returned to its first abutment position. When the object 17 has reached or, respectively, moved past, the second position sensor 42, the bus station 46 also receives a respective position sensor signal and the bus station sends an instruction to the control valve 48 so that the pressure P is turned off. Accordingly the servo piston 21 may be shifted back by the force of the helical spring 22 into the illustrated position, the compressed air obtaining at the top side of the servo piston 21 being able to flow by way of the first pressure line 29 and the control valve 48 to the vent connection 49b and thence into the surroundings. When the damping cylinder and accordingly the abutment member 15 have reached their top functional position 45, this will be detected by the third position sensor 44 and a position sensor signal is sent to the bus system 46. The abutment module 11 is now ready to singularize a newly arriving object 17.

The invention claimed is:

1. An abutment module, more especially for automatic processing and conveying equipment, comprising an abutment member arranged on a base for objects moving in a current working direction of movement in a plane of motion, such abutment member being able, by means of a fluid power operated servo member, to be shifted out of and back into such plane of motion, at least one position sensor being provided by which at least the abutment position of such object striking the abutment member may be detected, wherein a bus station for a bus system to detect and process position sensor signals of the at least one position sensor is integrated in the abutment module, and at least one control valve is integrated in the abutment module, such control valve being able to be controlled electrically by way of the bus system and serving for control of the servo member.

2. The abutment module as set forth in claim 1, comprising at least one fluid connection for the connection of a unregulated fluid duct.

3. The abutment module as set forth in claim 1, comprising at least one bus connection for a bus duct.

4. The abutment module as set forth in claim 1, wherein the at least one fluid connection and the at least one bus connection are arranged on the same outer side of the abutment module.

5. The abutment module as set forth in claim 1, wherein at least one of the position sensors is provided for detection of the top functional position, in the path of motion of the objects, of the abutment member.

6. The abutment module as set forth in claim 1, wherein at least one of the position sensors is adapted for detection of the position of an object moving past the abutment module.

7. The abutment module as set forth in claim 1, comprising a damping means by which movement of the abutment member may be damped between a first abutment position and a second terminal abutment position, the one abutment position able to be detected by means of the at least one position sensor being the terminal abutment position of the abutment member.

8. The abutment module as set forth in claim 1, wherein the bus system is a field bus system and more particularly an AS-i bus system.

9. The abutment module as set forth in claim 1, comprising a control module unit formed separately from the base and more especially detachably secured to it, said control module unit accommodating the bus station, the control valve and at least one of the position sensors.

10. The abutment module as set forth in claim 1, wherein the control valve is in the form of a solenoid valve.

* * * * *